United States Patent [19]

Kolich et al.

[11] Patent Number: 4,945,140
[45] Date of Patent: Jul. 31, 1990

[54] PROCESS FOR PREPARATION OF PHOSPHONITRILIC FLUOROELASTOMERS

[75] Inventors: Charles H. Kolich; W. Dirk Klobucar, both of Baton Rouge, La.

[73] Assignee: Ethyl Corporation, Richmond, Va.

[21] Appl. No.: 373,449

[22] Filed: Jun. 30, 1989

[51] Int. Cl.$^5$ .............................................. C08G 79/02
[52] U.S. Cl. ..................................... 525/538; 528/399
[58] Field of Search ........................ 525/538; 528/399

[56] References Cited

U.S. PATENT DOCUMENTS

| | | | |
|---|---|---|---|
| 3,370,020 | 2/1968 | Allcock et al. | 528/399 |
| 3,515,688 | 6/1970 | Rose | 528/399 |
| 3,888,800 | 6/1975 | Allcock | 528/399 |
| 4,005,171 | 1/1977 | Reynard et al. | 423/300 |

Primary Examiner—Harold D. Anderson
Assistant Examiner—T. Mosley
Attorney, Agent, or Firm—Richard J. Hammond

[57] ABSTRACT

An improved process for the preparation of highly fluorinated phosphonitrilic elastomers is disclosed. The fluoroalkoxy substituents on phosphonitrilic fluoroelastomers which contain some or all fluoroalkoxy groups in which the terminal carbon bears one or more hydrogen atoms are exchanged with fully fluorinated alkoxide groups in which the terminal carbon bears three fluorines. The process is accomplished using a ligand replacement mixture of an alkali metal fluoroalkoxide of the formula $MOC_n^{f'}$ and a fluoroalcohol of the formula $HOC_n^{f'}$ where $C_n^{f}$ is $-(CH_2)_y(CF_2)_nCF_3$ where y is an integer 1 or 2 and n is an integer from 0 to 20 and $C_n^{f'}$ is the same or different from $C_n^{f}$ where $C_n^{f'}$ is $-(CH_2)_y(CF_2)_nCF_3$ where y and n are as previously defined.

9 Claims, No Drawings

PROCESS FOR PREPARATION OF PHOSPHONITRILIC FLUOROELASTOMERS

This invention relates to a process for preparing phosphonitrilic fluoroelastomers that have enhanced solvent resistance. More particularly, the invention is directed to the preparation of phosphonitrilic fluoroelastomeric polymers by interchanging of certain fluoroalkoxy groups pendant on the phosphorus atom of the polymer backbone with other groups that provide a final copolymer of improved resistance to degradation from polar solvents such as certain hydraulic fluids, methanol, and the like.

The preparation of phosphazene homopolymers by reaction of polymerized $PNCl_2$ with various alkoxides is taught in U.S. patents to Allcock, et al, 3,370,020 and to Rose, 3,515,688, and elsewhere in the literature.

The properties of the homopolymers are excellent for certain uses, but are less satisfactory for other purposes and as a consequence, copolymers with randomly distributed units have been developed.

Conventional methods of producing copolymers utilize the homogeneous reaction of mixtures of alkoxides with poly(dichlorophosphazene) which can result in copolymers having structures and properties dependent on the relative reactivities of the alkoxides with the chloropolymer. The relative reactivities depend both on steric and electronic factors of the entering ligand.

In Allcock, U.S. Pat. No. 3,888,800, a method of preparing copolymers is disclosed that permits the formation of copolymers having a controlled structure. Briefly, that method involves the polymerization of $(PNCl_2)_3$ by any suitable means known in the art; reaction of a solution of the chloropolymer with a suitable alkoxide to produce a homopolymer having recurring units represented by the general formula:

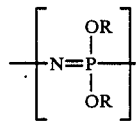

where R is a fluoroalkyl group; and further reaction of the homopolymer solution with a different ligand OR' (R' is a different fluoroalkyl group than R) whereby a selected number of groups OR interchange with and are displaced by groups OR'. Depending on R', the resulting copolymer can be tailored for desired properties.

Among the more desirable properties of the phosphazene elastomers is good solvent resistance. Materials displaying such characteristics are typically those where R' is a fluorocarbon such as $(CH_2)_y(CF_2)_nCF_3$ where y is 1 or 2 and where n is 0 to 20. Rose, referred to above, discloses the direct preparation of these highly fluorinated phosphazenes by substitution of poly(dichlorophosphazene) with sodium fluoroalkoxides in solution. These compositions display acceptable low temperature flexibility and high physical strength and are conceded to be excellent candidates for gasket, bladder, fuel tank sealing applications and the like where fluids adversely effecting conventional elastomeric compositions are typically employed. Unfortunately, while the prior art processes are able to produce such elastomers, the homogeneous substitution and/or interchange-replacement techniques mentioned earlier yield highly impure copolymers displaying very low or no solubility in most solvents. As such these copolymers are extremely difficult to purify.

Accordingly, it is an object of the present invention to provide a process for producing a phosphonitrilic fluoroelastomer displaying superior solvent resistance.

It is a further object of the present invention to provide a process for the preparation of phosphonitrilic fluoroelastomers that display improved resistance to polar solvents while retaining other good physical characteristics.

It is an additional objective of the present invention to provide a process for preparing phosphonitrilic fluoroelastomers by replacement of some or all of certain difluoro-methyl-terminated aliphatic fluorocarbon substituents on the polymer backbone with one or more trifluoromethylterminated aliphatic fluorocarbon substituents.

In summary, the invention contemplates a process for the preparation of phosphonitrilic fluoroelastomers by first preparing a phosphonitrilic polymer of the formula:

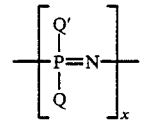

where x is an integer from about 3 to about 50,000, Q and Q' are the same or different and are fluoroalkoxy of the formula $—OCH_2(CF_2)_mCF_2Z$ where m is an integer of from 0 to 20 and Z is hydrogen or fluorine; and effecting replacement of some or all of the Q and/or Q' with the group $—OC_n^f$ where $C_n^f$ is an aliphatic fluorocarbon moiety represented by the formula $—(CH_2)_y(CF_2)_nCF_3$ where y and n are as previously defined and $C_n^f$ may be the same or different than Q and Q' where Z is fluorine. The replacement is accomplished by reacting said phosphonitrilic fluoroelastomer with a ligand replacement mixture of i) an alkali metal fluoroalkoxide of the formula $MOC_n^f$ where M is an alkali metal and $C_n^f$ is as previously defined and ii) a fluoroalkanol of the formula $HOC_n^f$ where $C_n^f$ may be the same or different than $C_n^f$ and where $C_n^f$ is as previously defined.

In the process of preparing phosphonitrilic fluoroelastomer of the present invention, an alkali metal fluoroalkoxide of the formula $MOC_n^f$ where M is the alkali metal and $C_n^f$ is an aliphatic fluorocarbon moiety of the formula $—(CH_2)_y(CF_2)_nCF_3$ where y is the integer 1 or 2 and n an integer from 0 to 20 is first prepared. See for example Allcock, U.S. Pat. No. 3,888,800 referred to earlier.

The alkali metal alkoxide useful in the process of this invention can be selected from any of the metals of Group IA of the Periodic Table of Elements. Mixtures of such metals may also be used. Preferably these metals are sodium or potassium, most preferably sodium.

The fluoroalcohols useful in this invention as well as those used to prepare the fluoroalkoxide component of the process of the present invention can be any alcohol of the formula $CF_3(CF_2)_n(CH_2)_yOH$ where y is an integer 1 or 2 and n is an integer of from 0 to 20. Preferably the alcohols are those where y=1 and n is from 1 to 13. Such alcohols are illustrated by 2,2,3,3,3-pentafluoropropanol, 3,3,4,4,5,5,5-heptafluoropentanol, 2,2,3,3,4,4,5,5,5-nonafluoropentanol, 2,2,3,3,4,4,5,5,-

6,6,6-undecafluorohexanol, 2,2,3,3,4,4,5,5,6,6,7,7,7-tridecafluoroheptanol and the like. Particularly preferred fluoroalcohols are 2,2,3,3,4,4,4-heptafluorobutanol and 2,2,3,3,4,4,5,5,6,6,7,7,8,8,8-pentadecafluorooctanol.

The solvent useful in this process should be inert, i.e., does not react with either of the reactants to any appreciable extent. Thus such solvent or mixture of solvents should not contain for example any carboxy functionality. Similarly, since more than trace amounts of water interfere with the reaction, anhydrous solvents are preferred. In addition to being inert to the reactants, the solvent must be one that is a good solvent (substantially dissolves) the phosphonitrilic fluoroelastomer being subjected to the process of this invention. The normally liquid solvents of the cyclic ethers are therefore preferred. Particularly preferred is tetrahydrofuran.

The extent of exchange is dependent on the quantity of compounds $MOC_n^f$ and $HOC_n^f$ in solution used as reactants in this invention. Solutions too dilute do not displace enough of the difluoromethyl-terminated substituents on the polymer backbone to impart the desired degree of resistance to polar solvents. Thus alkoxide concentrations of about 50 mole % are useful in practicing the process of this invention.

The process of the present invention is normally conducted at room temperature, i.e., 25°C. although higher or lower temperatures may also be used.

Q and Q' in the phosphonitrilic fluoroelastomer useful in the present invention are fluoroalkoxy groups derived from fluoroalcohols, especially those of the formula $ZCF_2(CF_2)_m(CH_2)_yOH$ in which Z is hydrogen or fluorine, y is 1 and m is an integer from 0 to 13 as illustrated by trifluoroethanol, 2,2,3,3,3-pentafluoropropanol, 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed Q and Q' substituent groups in copolymers, mixtures of the foregoing alcohols may be employed.

The group Q and/or Q' may also have some olefinic unsaturation. Compounds of this type are typically alkenyloxy (i.e. oxy radical of alkenyl compounds) and alkenylaryloxy (alkenyl-substituted aryloxy) groups and are ethylenically unsaturated monovalent radicals which are capable of undergoing a crosslinking chemical reaction. Examples of such crosslinking moieties and methods for their cure are described in U.S. Pat. Nos. 3,702,833; 3,844,983; 3,888,799; 4,055,520; and 4,061,606 which are hereby incorporated by reference. Such groups having olefinic unsaturation include monovalent radicals such as $-OCH=CH_2$; $-OR'CH=CH_2$;

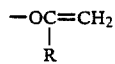

$-OR'CF=CF_2$; $-OCH_2RC=CF_2$ and $-OR'R^2$ in which R is an aliphatic or aromatic radical, R' is an alkylene or arylene and $R^2$ is vinyl, allyl, crotyl or the like.

The alkenyloxy groups are preferably derived from unsaturated aliphatic alcohols such as allyl alcohol, 3-butene-1-ol, 2,3,3-trifluoropropen-1-ol and the like.

The alkenylaryloxy groups are preferably derived from unsaturated aromatic alcohols such as vinylphenols, allylphenols, eugenol, isoeugenol and the like.

Such olefinic unsaturated or crosslinking substituents may be present in an amount between about 0.01 mole percent to about 55 mole percent and more commonly from about 0.1 mole percent to about 10 mole percent based on the replaceable chlorine in the starting poly(dichlorophosphazene).

Poly(dichlorophosphazene) polymers which are employed as starting materials in preparing the polymers of this invention are well known in the art as illustrated in U.S. Pat Nos. 3,370,020; and 4,005,171, the disclosures of which are incorporated herein by reference.

These polymers have the general formula $-(NPCl_2)_x-$, in which x may range from 20 to 50,000 or more. As described in the aforementioned references, the polymers are made by first reacting ammonium chloride with phosphorus pentachloride in chlorobenzene at 120°–130° C. to form a mixture of cyclic and low molecular weight open-chain chlorophosphazenes. After removing the reaction solvent, the cyclic phosphazenes can be separated by any of several techniques including extraction, crystallization, distillation or sublimation.

High molecular weight open-chain polydichlorophosphazenes can be made by purifying the cyclics and then heating them under an inert atmosphere at about 180°–270° C. for 2–24 hours or more until the desired degree of polymerization has occurred. A small amount of a catalyst such as boron trichloride can be added to promote the polymerization. The polymerization mixture can then be dissolved in a solvent such as benzene, toluene or cyclohexane and this solution added to a non-solvent such as heptane which will cause the high molecular weight open-chain poly(dichlorophosphazene) to precipitate leaving the cyclic species in solution to be easily separated from the high molecular weight open-chain polymer.

A preferred process for preparing the poly(dichlorophosphazene) polymers used in the process of this invention is described in the aforementioned U.S. Pat. No. 4,005,171.

The poly(fluoroalkoxy)phosphazenes used as starting materials for the process of the invention are prepared by substitution of chloro groups on the poly(dichlorophosphazene). The poly(dichlorophosphazene) is dissolved in a solvent such as tetrahydrofuran, toluene or cyclohexane and this solution is added to a tetrahydrofuran solution of the sodium salts of eugenol or ortho-allylphenol (where a curable polymer is desired) and the fluoroalcohol(s). Preferably, the solution of poly(dichlorophosphazene) is first reacted with a solution of sodium eugenoxide to introduce the desired amount of eugenoxy substituents. This mixture is then reacted with a tetrahydrofuran solution of the sodium fluoroalkoxides to complete the substitution. The reaction mixture is then neutralized and centrifuged or filtered to remove the alkali metal chloride by-product followed by addition of the resulting salt-free polymer solution to a nonsolvent.

In order to carry out the ligand exchange reaction, a solution of the phosphonitrilic fluoroelastomer prepared as illustrated above is treated with a ligand replacement mixture of (i) an alkali metal fluoroalkoxide of the formula $MOC_n^f$ and (ii) a fluoroalcohol of the formula $HOC_n^f$. Moieties $C_n^f$ and $C_n^f$ may be the same or different and have the structure $-(CH_2)_y(CF_2)_nCF_3$ where y is 1 or 2 and n is an integer from 0 to 20. Components of the mixture (i) and (ii) are generally useful at mole ratios of about 4:1 to about 1:4 preferably about 3:1 to about 1:3 most preferably from about 2:1 to about 1:2. The mole ratio of ligand replacement mixture to that of the phosphonitrilic polymer being subjected to ligand replacement is typically about 9:1 to about 1:2. In many cases the reaction is favored by excess amounts of the ligand replacement mixture. Preferably ratios of about 4:1 to about 1:2, most preferably about 3:1 to 1:1 ligand replacement mixture to phosphonitrilic fluoroelastomer are found useful in the process of this invention.

As noted previously, the ligand replacement mixture causes substitution of Q and Q' in the phosphonitrilic fluoroelastomer with ligand $-OC_n{}^f$ and $-OC_{n'}{}^f$. It has been found to be most practical to halt the reaction after the Q and Q' substituents have been replaced by $-OC_n{}^f$ and $-OC_{n'}{}^f$ to the extent of about 50% of the charged level of $MOC_n{}^f$. The resulting highly fluorinated polymers are obtained with very little contamination and require minimal work-up before being employed as gasketing or other materials in high polarity solvent environment.

EXAMPLE 1

Poly[bis(trifluoroethoxy)phosphazene] containing 0.22 wt% eugenoxy cure sites (207.1 g, 0.851/n mole) was dissolved by stirring overnight in 1314 g of dry tetrahydrofuran in a dry glass reaction vessel. To a second dry glass reaction vessel was added 517 g of sodium heptafluorobutoxide solution (853 meq), 248 g of a dry tetrahydrofuran solution of pentadecafluorooctanol (0.43 mole) and 855 g of dry tetrahydrofuran. The polyphosphazene solution was added to the fluoroalkoxide solution over 1.5 hr at 24°–27 C. The reaction mixture was allowed to stir at room temperature for 3 hours during which time a finely divided precipitate formed. The reaction mixture was acidified by the addition of 44.8 g of concentrated sulfuric acid. The reaction mixture was poured into a mixture of 8.0 L of n-heptane and 4.0 L of hexanes. The precipitated gum was collected and then redissolved in 3.00 L of 2/1 (V/V) 1,1,2-trichlorotrifluoroethane/acetone. The solution was diluted with an additional 1.60 L of the above solvent mixture. Deionized water (1.00 L) was added and stirred for 15 minutes. The mixture was allowed to stand until phase separation was complete. The organic phase (lower phase) was removed and stirred with 2.00 L of deionized water and acetone (300 ml). The mixture was allowed to separate and the milky white organic phase was removed and then pumped through a 90 micron filter into 28 L of n-heptane. The precipitated polymer was collected and brought to a constant weight of 269 g at 73°C. and 5 torr. The polymer had the following composition by fluorine NMR:

73 mole % $OCH_2CF_3$
18 mole % $OCH_2CF_2CF_2CF_3$
9 mole % $OCH_2C_7F_{15}$

Table I contains additional analyses for the polymer.

COMPARATIVE EXAMPLE 1

To a glass reaction vessel was added 420 grams of a tetrahydrofuran solution of sodium trifluoroethoxide (1120 meq), 270 grams of a tetrahydrofuran solution of sodium heptafluorobutoxide (389 meq), 115.9 grams of a tetrahydrofuran solution of pentadecafluorooctanol (0.183 mol) and 4.07 grams of sodium metal (0.177g-atom). The reaction mixture was stirred 24 hours at 60° C. To a second glass vessel was added 785 grams of a cyclohexane solution of polydichlorophosphazene (90.2 grams of polymer, 1557 meq chloride) followed by 192.0 grams of a tetrahydrofuran solution of sodium eugenoxide (7.8 meq). The reaction mixture was stirred for 20 minutes at room temperature. The polyphosphazene solution was added to the fluoroalkoxide mixture over 22 minutes at 60°–67° C. The mixture was stirred for 30 minutes at 60° C. The reaction mixture containing the precipitated polymer was then transferred to a stainless steel pressure vessel and heated at 136° C. for 11 hours. After cooling to room temperature, the reactor was emptied and rinsed with 852 grams of tetrahydrofuran. Concentrated sulfuric acid (7.1 grams) and deionized water (10 liters) were added to the reaction mixture. The precipitated gum was collected and allowed to dry overnight. The gum was combined with a gum from a second identical run and dried for 4 hours at 75° C. and a pressure of about 20 torr. The gum (543 grams) was dissolved in 6.0 liters of 90/10 (volume%) 1,1,2-trichlorotrifluoroethane/acetone. The solution was washed twice with 2.0 liters of deionized water. The organic phase was pumped through a 90 micron filter into 12 liters of heptane. The precipitated gum was collected and allowed to dry overnight in a hood. The gum was brought to constant weight at 73° C. and a pressure of about 20 torr to obtain 369 grams of beige gum. Fluorine NMR indicated a substituent distribution of:

71 mole % $OCH_2CF_3$
21 mole % $OCH_2CF_2CF_2CF_3$
9 mole % $OCH_2C_7F_{15}$

Additional analyses for the product are shown in Table I.

EXAMPLE 2

A reaction vessel with a bottom stopcock was charged with 229.2 g (0.853/n mole) of $[PN(OCH_2CF_3)_{1.9}(OCH_2[CF_2CF_2]_x-H)_{0.1}]_n$ polymer containing 0.75 wt % eugenoxy cure sites and 2155 g of dry tetrahydrofuran. After stirring for several hours to dissolve the polymer, the contents of the vessel were added over 52 minutes at room temperature to a second vessel containing 514.8 g of a tetrahydrofuran solution of sodium heptafluorobutoxide (849.4 meq or 50 mol %), 246.0 g of a tetrahydrofuran solution of pentadecafluorooctanol (0.405 mol) and 472 g of additional dry tetrahydrofuran. The yellow reaction mixture was stirred for 4.5 hours at ambient temperature during which time a finely divided precipitate formed. The reaction mixture was poured into a stirred mixture of 5.00 kg ice, 5.00 kg deionized water and 92.6 g of concentrated hydrochloric acid. Additional deionized water (2.00 L) was added. The excess water was squeezed out of the gum, and the gum was dried in a hood under an infrared lamp. The gum was brought to constant weight at 5 torr and 73° C. to obtain 299 g of polymer. The polymer was found to have the following composition by fluorine NMR:

62 mole % $OCH_2CF_3$
20 mole % $OCH_2CF_2CF_2CF_3$
11 mole % $OCH_2C_7F_{15}$
8 mole % $OCH_2(CF_2CF_2)_x-H$ Additional analytical data are shown in Table I.

The following formulation (Formulation A) was prepared containing the eugenoxy substituted polyfluoroalkoxyphosphazenes of Example 1 and comparative Example 1 and tests were conducted to measure the physical properties of the formulation. In particular, 50 percent modulus, tensile strength, and compression set and elongation were measured.

Tensile properties were obtained following ASTM D 412-83, Method B (Standard Test Methods for Rubber Properties in Tension). The term "modulus" is used following common usage to refer to tensile stress at a given relative elongation. English units (psi) have been used.

In the same tensile strength test, elongation at breaking point was also measured both before and after heat aging of the test specimens. Elongation properties are reported as the percent retention of initial elongation. Higher values are preferred.

Compression set measurements were obtained following ASTM D395-78 (Standard Test Methods for Rubber Property-Compression Set) using Method B (constant deflection). A molded Type 1 specimen (0.5" thick) was used and compressed 25% under the conditions noted. Smaller compression set values indicate less retention of the test compression conditions and are improvements.

Higher moduli values are preferred in many applications particularly in seals and gaskets. Higher tensile strengths are always preferred.

Formulation A contained 85 grams of gum prepared from Example 1, or comparative Example 1, 2.5 grams of stabilizer, 10.2 grams of carbon black, 23.8 grams of inorganic filler, 0.21 gram of silane modifier, 0.85 gram of organic fibrous filler and 0.68 gram peroxide curing agent [40% active α,α'-bis(tert-butyl-peroxy)diisopropylbenzene on clay, (Vul-cup 40KE, Hercules, Inc.]. The formulated gum was cured for 30 minutes (50 minutes for compression set buttons) at 171° C. and then post-cured 4 hours at 77° C. Fifty percent modulus was measured initially and tensile strength was measured initially and after aging at a specified time and temperature. Compression set was measured after compressing the test specimen for a specified time at a specified temperature.

For comparative purposes, an identical formulation (Formulation B) was prepared except that instead of containing 85 grams of the gum from Example 1 or comparative Example 1 it contained a commercially available substantially linear, high molecular weight polyfluoroalkoxyphosphazene terpolymer consisting of a substantially linear chain of alternating N and P atoms, in which substituents on the P atoms included o-allyl phenoxy, —OCH$_2$CF$_3$ and HF$_2$C—(CF$_2$)$_m$—CH$_2$O groups in which m had a value of 1–13 averaging about 3.

Further tests were conducted to determine the percent of volume swell of the compositions following ASTM D-471 (Standard Test Method for Rubber Property-Effect of Liquids) using molded specimens 80 mils thick, 1.0"in width and ; 1.0"in length. Volumes were measured both initially and after a 70 hour immersion period in 85/15 ASTM Fuel C/methanol at reflux and in methanol at room temperature. ASTM Fuel C is a 50/50 blend of isocotane/toluene. Tests results are given in Table II.

The materials of the Examples had good physical properties. The polymer of Example 1 exhibited a low elongation and had volume swells that were an order of magnitude lower than those of conventional phosphonitrilic fluoroelastomer compounds (for example, EYPEL®—F elastomer, [PN(OCH$_2$CF$_3$)$_{1.3}$(OCH$_2$(CF$_2$CF$_2$)$_x$ —H)$_{0.7}$]$_n$). Furthermore, the physical properties and volume swells appear to be identical to those of a material made by the direct substitution of poly(dichlorophosphazene) with the sodium salts of the same substituents as demonstrated by Comparative Example 1.

TABLE I

|  | Example 1 | Example 2 | Comparative Example 1 |
|---|---|---|---|
| Sodium (wt %) | 0.067 | 0.082 | 0.007 |
| Total Chloride (wt %) | 0.012 | 0.086 | 0.056 |
| Tg (°C.) | −61 | −57 | −61 |
| Eugenoxy level (wt %) | 0.20 | 0.53 | 0.20 |

TABLE II

|  | EYPEL ®-F Elastomer Compound | Comparative Example 1 | Example 1 |
|---|---|---|---|
| 50% Modulus | 400 | 540 | 610 |
| Tensile Strength | 1670 | 1490 | 1450 |
| Elongation | 120 | 95 | 86 |
| Durometer | 61 | 60 | 76 |
| Compression Set, % 70 hr/149° C. | 28 | 21 | 27 |
| After 70 hours/ 200° C. Tensile Strength | 1160 | 1120 | 1220 |
| Elongation | 169 | 95 | 95 |
| Volume Swell, % Methanol, 70 hrs | 172 | 13 | 13 |
| 15% MeOH/85% Fuel C 70 hrs at reflux | 56 | 17.3 | — |

EYPEL ®-F is a registered trademark of the Ethyl Corporation.

We claim:

1. A process for the preparation of phosphonitrilic fluoroelastomer by treating a phosphonitrilic polymer of the formula

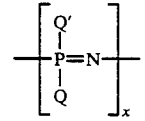

where x is an integer of from about 3 to about 50,000, Q and Q' are the same or different and are fluoroalkoxy of the formula —O(CH$_2$)$_y$(CF$_2$)$_m$CF$_2$Z where y is 1 or 2, m is an integer from 0 to 20 and Z is hydrogen or fluorine with a ligand replacement mixture of i) an alkali metal fluoroalkoxide of the formula MOC$_{nf}$ where M is an alkali metal and C$_{nf}$ is a fluorocarbon moiety represented by the formula —(CH$_2$)$_y$(CF$_2$)$_n$CF$_3$ where y is 1 or 2 and n is an integer from 1 to 20 and ii) a fluoroalcohol of the formula HOC$_{nf'}$ where C$_{nf'}$ is the same or different than C$_{nf}$ where y and n are as previously defined; replacing some of said Q and Q', where Q and Q' are as previously defined with C$_{nf}$ and C$_{nf'}$; whereby the resulting phosphonitrilic fluoroelastomer possesses a decreased number of fluoroalkoxide groups where Z is hydrogen.

2. The process in accordance with claim 1 wherein the ratio of said alkali metal fluoroalkoxide to said fluoroalcohol is from about 4:1 to about 1:4.

3. The process of claim 1 wherein said ratio of said ligand replacement mixture to said phosphonitrilic polymer is from about 9:1 to about 1:1.

4. The process of claim 1 wherein about 50% of said Q and Q' in said resulting phosphonitrilic fluoroelastomer have been replaced.

5. The process of claim 1 wherein the ratio of said alkali metal fluoroalkoxide to said fluoroalcohol is the ligand replacement mixture is from about 3:1 to about 1:3 and the ratio of said ligand replacement mixture to said phosphonitrilic polymer is from about 8:1 to about 2:1.

6. The process of claim 1 wherein Q and Q' are the same or different and are fluoroalkoxy of the formula —OCH$_2$(CF$_2$)$_m$CF$_2$Z where Z is hydrogen or fluorine and m is an integer from 0 to 13 with the proviso that some of said Q and Q' groups have olefinic unsaturation in an amount between about 0.1 mole percent to about 10.0 mole percent.

7. The process of claim 7 wherein, some of said Q and said Q' said groups having olefinic unsaturation are —OCH$_2$=CH$_2$, —OR'CH=CH$_2$,

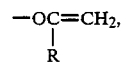

OR'CF=CF$_2$, —OCH$_2$RC=CF$_2$ or —OR'R$^2$ where R is an aliphatic or aromatic radical, R' is alkylene or arylene and R$^2$ is vinyl, allyl or crotyl.

8. The process of claim 1 wherein said treatment is carried out at about 25° C. in a homogenous solution.

9. A phosphonitrilic fluoroelastomer prepared by the process of claim 1.

* * * * *

UNITED STATES PATENT AND TRADEMARK OFFICE
CERTIFICATE OF CORRECTION

PATENT NO. : 4,945,140
DATED : July 31, 1990
INVENTOR(S) : Charles H. Kolich; W. Dirk Klobucar It is certified that error appears in the above-identified patent and that said Letters Patent is hereby corrected as shown below:

Column 8, line 51 reads "$Cn^f$ is the" and should read --$Cn^{f'}$ is the--.

Column 8, line 54 reads "and $Cn^f$;" and should read --and $Cn^{f'}$;--

Column 10, line 1 reads "of Claim 7" and should read --of Claim 6--.

Signed and Sealed this

Fifth Day of November, 1991

Attest:

HARRY F. MANBECK, JR.

*Attesting Officer*                *Commissioner of Patents and Trademarks*